United States Patent [19]

Du Pont et al.

[11] 4,352,139

[45] Sep. 28, 1982

[54] FLEXIBLE CONNECTOR FOR H.V. ARRESTER

[75] Inventors: John P. Du Pont; Hatim H. Taj, both of Waukesha; Randall R. Schoenwetter, Milwaukee; Theodore J. Vanlankvelt, Elm Grove; Robert E. Kwiatkowski, Eagle; Richard W. Lange, Waukesha, all of Wis.

[73] Assignee: RTE Corporation, Waukesha, Wis.

[21] Appl. No.: 118,580

[22] Filed: Feb. 4, 1980

[51] Int. Cl.[3] .............................................. H02H 9/04

[52] U.S. Cl. ............................... 361/117; 339/147 R; 361/128

[58] Field of Search ............... 339/111, 147 R, 147 P; 361/117, 126–128

[56] References Cited

U.S. PATENT DOCUMENTS

| | | | |
|---|---|---|---|
| 3,727,108 | 4/1973 | Westrom | 361/127 |
| 3,806,765 | 4/1974 | Matsuoka et al. | 361/128 |

*Primary Examiner*—Harry E. Moose, Jr.
*Attorney, Agent, or Firm*—Ronald E. Barry

[57] ABSTRACT

A gapless arrestor assembly for a high voltage bushing including an insulating elastomeric housing having a bore formed in one portion thereof and a receptacle formed in another portion thereof and a surge arrester assembly positioned in the bore in said housing, the arrester assembly being formed from one or more surge arrester blocks and including a connector element at the inner end of the arrester blocks, the connector element being movably connected to the surge arrester blocks and a probe contact positioned in the receptacle and rigidly connected to the connector element, the connector element allowing movement of the probe contact independent of the arrester blocks.

12 Claims, 6 Drawing Figures

FLEXIBLE CONNECTOR FOR H.V. ARRESTER

BACKGROUND

When a gapless elbow arrester is mounted on a high voltage transformer bushing, high moment forces can be set up in the electrically conductive probe which are of sufficient force to bend or break the electrical connector on the surge arrester assembly. These moment forces are created because a hot stick several feet long is used to install the arrester on the bushing. If the arrester is mounted off-center to the bushing a high moment force can be imparted to the connector. If the connector is rigidly attached to the surge arrester block, it is often broken off from the block producing an electrical disconnection between the connector and the surge arrester block.

SUMMARY OF THE INVENTION

The above problem has been overcome by providing a flexible connection between the connector and the adjacent surge arrester block. This flexibility is provided by connecting the connector to the arrester block by one of a number of flexible connectors such as cables or springs or by using a mechanical connection that provides for or allows for movement of the connector with respect to the surge arrester block.

DRAWINGS

DETAILED DESCRIPTION

Figure 1:
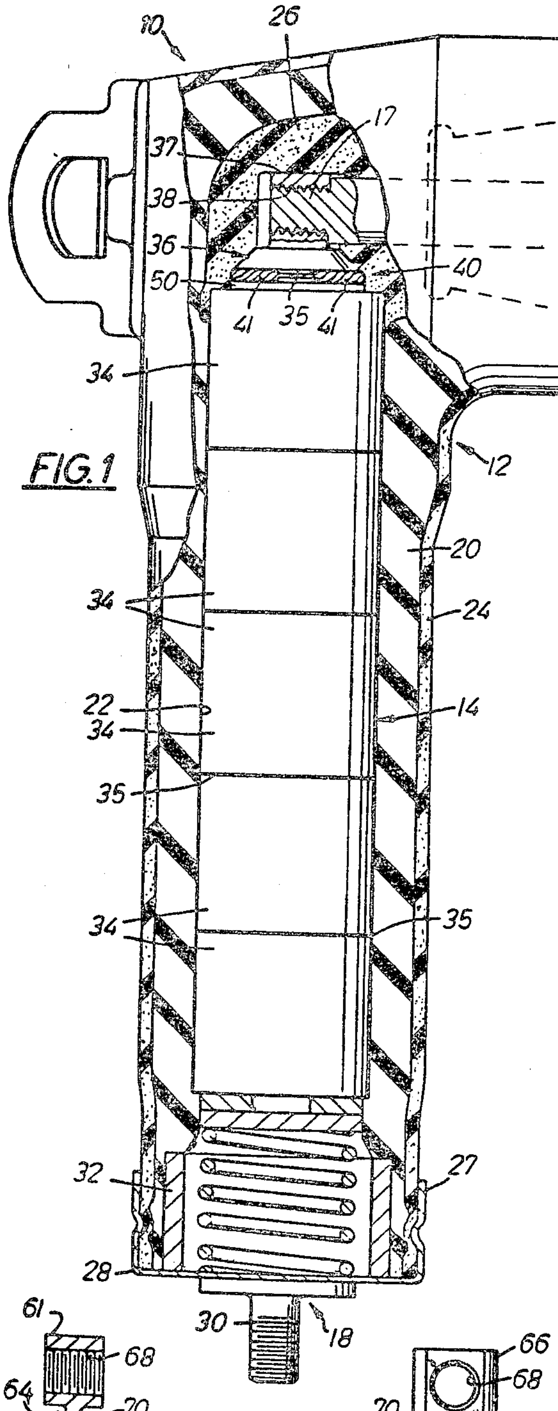
FIG. 1 is a side elevation view of a gapless elbow arrester shown partly in section to show the flexible connection of the connector to the surge arrester block.
Figure 1:
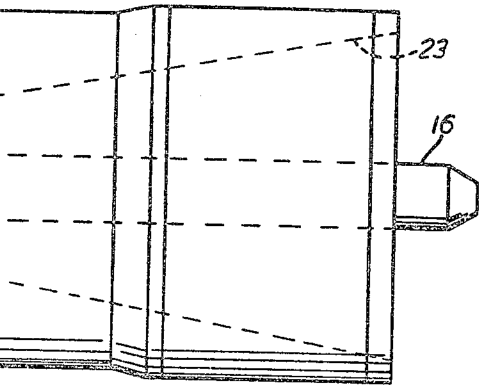

Referring to the drawing, the gapless elbow arrester 10 as shown generally includes an elastomeric housing 12, a surge arrester assembly 14 and an electrically conductive probe 16. The surge arrester assembly 14 is retained within the housing 12 by means of a cap assembly 18. As is generally understood in the art, the elbow arrester is mounted on a high voltage bushing by inserting the probe 16 into the bushing and forcing the housing onto the outer surface of the bushing so that the probe 16 establishes electrical communication with the corresponding connector in the bushing. Any forces imparted to the probe from angle will be transferred to the surge arrester assembly 14.

More particularly, the housing 12 includes an elastomeric dielectric inner portion 20 having a bore 22 for the arrester assembly 14 and a conical receptacle 23 for the probe 16. The bore 22 and conical receptacle 23 intersecting in a generally perpendicular relation to form the elbow configuration. An elastomeric electrically conductive shield 24 is provided on the outer surface of the dielectric portion 20. An electrically conductive elastomeric insert 26 is provided within the dielectric portion 20 at the intersection of the bore 22 with the conical receptable 23.

The cap assembly 18 includes an electrically conductive cap 28 having a flange 27 encircling the outer periphrey of the open end of the bore 22 in the housing 12 and a connector 30 secured to the cap 28. The cap 28 is secured to the outer surface of the housing 20 by magniforming the flange 27 to the shield 24. A rigid tube 32 can be provided within the open end of the bore 22 to support the housing for magniforming of the flange to the housing.

The surge arrester assembly 14 is positioned in the bore 22 and is formed from one or more surge arrester blocks 34, a connector 36 and a moveable connector assembly 40. The surge arrester blocks 34 are stacked in the bore 22 either individually or as a single unit and are rigidly interconnected by means of an epoxy cement 35 as described in co-pending application Ser. No. 118,579 entitled "Improved Corona Resistance in Arrester Block Assemblies" filed Feb. 4, 1980.

Means are provided at the one end of the arrester assembly 14 for electrically connecting the inner arrester block 34 to the probe 16. Such means is in the form of the connector 36 provided at the inner end of the surge block 34. The connector 36 includes a base 35 and a head 37 having a threaded bore 38. The probe 16 includes a threaded section 17 which is threadedly received in bore 38.

Figure 5:
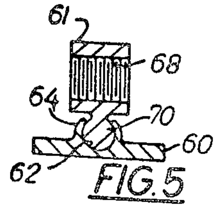
FIG. 5 is a side view in section of a connection assembly utilizing a pivotal connection.
Figure 6:
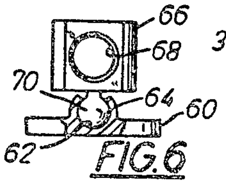
FIG. 6 is a front view partly in section of the embodiment shown in FIG. 5.

In accordance with the invention, the connector 36 is electrically and mechanically connected to the surge arrester block 34 by means of a moveable connector assembly 40. In this regard, the connector assembly means can be in the form of a flexible member as seen in FIGS. 1, 2, 3 and 4 or it can be in the form of a mechanical member as seen in FIGS. 5 and 6.

Referring more particularly to FIG. 1, the moveable connector assembly as seen therein comprises a pair of electrically conductive wires or ropes 41. One end of each wire 41 is secured to the base 35 of connector 36 and the other end can be secured to a conductive plate 50 which is positioned in abutting relation to the exposed end of the last surge arrester block 34 or directly to the surge arrester block 34. The ends of the wires 41 can be soldered or clamped to the conductive plate 50 and connector. The flexible wire or rope 41 can be wrapped in a spiral configuration to lay flat against the conductive plate 50 allowing the connector 36 to be brought into abutting engagement with the flexible member as seen in FIG. 1.

Figure 2:
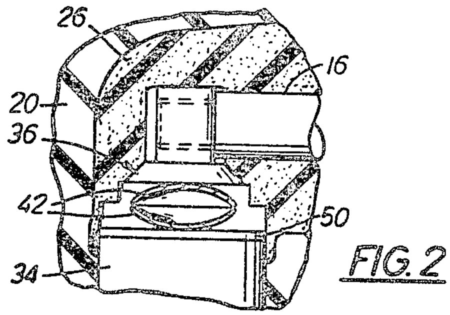
FIG. 2 is a view partly in section of one form of flexible spring connection for the connector.

Referring to FIG. 2, another form of moveable connector assembly is shown. In this embodiment of the invention the connector assembly is in a form of a pair of electrically conductive flexible leaf springs 42 positioned in the gap between the connector 36 and the washer 50. The leaf springs 42 are secured to the connector 36 and washer 50 to provide flexibility of motion of the connector 36, and maintaining electrical communication between the connector 36 and conductive plate 50.

Figure 3:
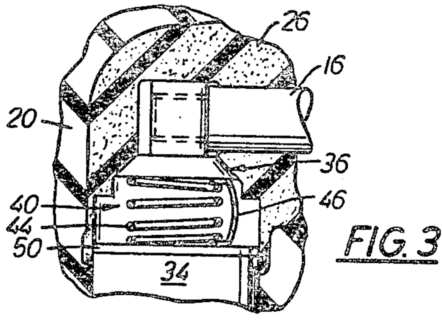
FIG. 3 is a view partly in section of another form of flexible spring connection.

Referring to FIG. 3, another form of moveable connector assembly is shown which comprises a helical spring 44 again positioned between the washer 50 and the connector 36. In using a spring 44 an electrically conductive shunt 46 may also be provided to assure electrical communication between the connector 36 and the washer 50.

Figure 4:
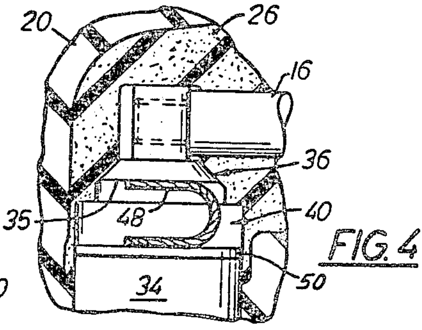
FIG. 4 is a view partly in section of a flexible cable connection.

Referring to FIG. 4 another form of moveable connector assembly is shown which includes a flat braided metallic rope 48 and a conductive washer 50. The rope 48 is secured to the base 35 of the connector 36 and to the washer 50. The washer 50 can be secured to the arrester block 34 by any means such as conductive epoxy cement as referred to above.

In FIGS. 5 and 6, a different form of connection assembly is shown which provides for pivotal movement between the connector and the surge arrester block. In this embodiment, a flat electrically conductive disk 60 is provided with a central recess 62 at the center which is surrounded by a flange 64. A connector 66 having a threaded bore 68 is connected to the plate 60 by means of a ball 70 which is seated in recess 62. The flange 64 is then crimped to the ball with sufficient pressure to allow for pivotal movement of the connector after assembly.

The embodiments of the invention in which an exclusive property and privilege is claimed and defined as follows:

1. A gaples arrester comprising a dielectric elastomeric housing having a bore in one portion and a receptacle in another portion thereof, an arrester block assembly positioned in said bore, said assembly being formed from one or more surge arrester blocks, a connector at one end of the surge arrester blocks, and an electrically conductive flexible wire connecting said connector to said surge arrester blocks, whereby said connector will be located at the inner end of said receptacle when said assembly is positioned in said bore.

2. A gapless arrester comprising a dielectric housing having a bore and a receptacle, a surge arrester block assembly positioned in said bore and extending partially into said receptacle to support a probe in said receptacle, said assembly including one or more surge arrester blocks, a connector for connection to the probe, a plate positioned in abutting relation to the inner end of the surge arrester blocks and a single electrically conductive flexible wire moveably connecting said connector to said plate.

3. A surge arrester block assembly for a high voltage terminator, said assembly comprising a surge arrester block, a connector, a plate positioned in abutting relation to said arrester block, and a single electrically conductive flexible wire connecting said connector to said plate to allow for movement of said connector with respect to said arrester block.

4. A gapless arrester comprising a dielectric elastomeric housing having a bore in one portion and a receptacle in another portion thereof, an arrester block assembly positioned in said bore, said assembly being formed from one or more surge arrester blocks, a connector at one end of the surge arrester blocks and a pair of electrically conductive wires connecting said connector to said surge arrester blocks, each wire having one end connected to the end arrester block and the other end connected to said connector, whereby said connector will be located at the inner end of said receptacle, when said assembly is positioned in said bore.

5. A gapless arrester comprising a dielectric elastomeric housing having a bore in one portion and a receptacle in another portion thereof, an arrester block assembly positioned in said bore, said assembly being formed from one or more surge arrester blocks, a connector at one end of the surge arrester blocks, and a pair of leaf springs connecting said connector to said surge arrester blocks, one of said leaf springs being secured to said connector and the other of said leaf springs being connected to the end of the arrester blocks, whereby said connector will be located at the inner end of said receptacle when said assembly is positioned in said bore.

6. A gapless arrester comprising a dielectric elastomeric housing having a bore in one portion and a receptacle in another portion thereof, an arrester block assembly positioned in said bore, said assembly being formed from one or more surge arrester blocks, a connector at one end of the surge arrester blocks, and a helical spring and a shunt cable, connecting said connector to said surge arrester blocks, said helical spring being placed between the connector and the end of the surge arrester blocks and said cable being connected to said connector and said surge arrester block whereby said connector will be located at the inner end of said receptacle when said assembly is positioned in said bore.

7. A gapless arrester comprising a dielectric housing having a bore and a receptacle, a surge arrester block assembly positioned in said bore and extending partially into said receptacle to support a probe in said receptacle, said assembly including one or more surge arrester blocks, a connector for connection to the probe, a plate positioned in abutting relation to the inner end of the surge arrester blocks and a pair of electrically conductive wires moveably connecting said connector to said plate, each of said wires having one end connected to said plate and the other end connected to said connector.

8. A surge arrester block assembly for a high voltage terminator, said assembly comprising a surge arrester block, a connector, a plate positioned in abutting relation to said arrester block, and a pair of electrically conductive wires connecting said connector to said plate, each wire having one end connected to said plate and the other end connected to said connector whereby said connector is free to move with respect to said arrester block.

9. A gapless arrester comprising a dielectric housing having a bore and a receptacle, a surge arrester block assembly positioned in said bore and extending partially into said receptacle to support a probe in said receptacle, said assembly including one or more surge arrester blocks, a connector for connection to said probe, a plate positioned in abutting relation to the inner end of the surge arrester blocks and a pair of leaf springs moveably connecting said connector to said plate, one of said leaf springs being secured to said connector and the other of said springs being connected to said plate, whereby said connector can move with respect to said arrester block.

10. A surge arrester block assembly for high voltage terminator, said assembly comprising a surge arrester block, a connector, a plate positioned in abutting relation to said arrester block, and a pair of leaf springs connecting said connector to said plate to allow for movement of said connector with respect to said arrester block, one of said leaf springs being secured to said connector and the other of said leaf springs being connected to said plate.

11. A gapless arrester comprising a dielectric housing having a bore and a receptacle, a surge arrester block assembly positioned in said bore and extending partially into said receptacle to support a probe in said receptacle, said assembly including one or more surge arrester blocks, a connector for connection to said probe, a plate positioned in abutting relation to the inner end of said surge arrester blocks and a helical spring and a shunt cable moveably connecting said connector to said plate, said helical spring being placed between the connector and the end of the plate and said shunt cable being connected to said connector and to said plate.

12. A surge arrester assembly for a high voltage terminator, said assembly comprising a surge arrester block, a connector, a plate positioned in abutting relation to said arrester block, and a helical spring and a shunt cable connecting said connector to said plate to allow for movement of said connector with respect to said arrester block Said helical spring being placed between said connector and the end of said plate and the said shunt being connected to the connector and to the plate.

* * * * *